US008795089B2

(12) United States Patent
Kobayashi et al.

(10) Patent No.: US 8,795,089 B2
(45) Date of Patent: Aug. 5, 2014

(54) GAME DEVICE, IMAGE PROCESSING METHOD, AND INFORMATION RECORDING MEDIUM

(75) Inventors: Motoki Kobayashi, Tokyo (JP); Yousuke Kimoto, Kanagawa (JP); Yoshiaki Jitsukawa, Tokyo (JP); Keisuke Shimizu, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 672 days.

(21) Appl. No.: 12/265,106

(22) Filed: Nov. 5, 2008

(65) Prior Publication Data

US 2009/0118008 A1 May 7, 2009

(30) Foreign Application Priority Data

Nov. 7, 2007 (JP) ................................. 2007-289378

(51) Int. Cl.
*A63F 13/00* (2014.01)
*A63F 13/10* (2006.01)
(52) U.S. Cl.
CPC ........... *A63F 13/10* (2013.01); *A63F 2300/308* (2013.01); *A63F 2300/208* (2013.01)
USPC .............................................. 463/43; 463/31
(58) Field of Classification Search
USPC .................................................... 463/31, 43
See application file for complete search history.

(56) References Cited

U.S. PATENT DOCUMENTS

| 4,342,454 A * | 8/1982 | Baer et al. ......................... 463/31 |
| 5,779,548 A * | 7/1998 | Asai et al. ......................... 463/31 |
| 6,699,127 B1 * | 3/2004 | Lobb et al. ........................ 463/43 |
| 6,716,102 B2 | 4/2004 | Whitten |
| 6,724,385 B2 * | 4/2004 | Takatsuka et al. ............. 345/427 |

(Continued)

FOREIGN PATENT DOCUMENTS

| EP | 0983782 A2 | 3/2000 |
| JP | 2000107443 A | 4/2000 |

(Continued)

OTHER PUBLICATIONS

Office Action for corresponding Japanese Patent Application No. 2007-289378, dated Feb. 4, 2014.

(Continued)

*Primary Examiner* — Jay Trent Liddle
(74) *Attorney, Agent, or Firm* — Matthew B. Dernier, Esq.; Gibson & Dernier LLP

(57) ABSTRACT

To enable images of game screens concerning a plurality of game programs to be systematically stored in a storage unit and a desired image to be swiftly displayed on a display unit in a later time, a game device of the present invention includes: a program executing unit for executing each of a plurality of game programs; an identification information acquiring unit for acquiring identification information on the game program during execution of the game program; an image acquiring unit for acquiring at least one image of a game screen generated during the execution of the game program; an image storing unit for storing the at least one image into the storage unit in association with the identification information; and a display control unit for reading the image stored in association with any one of the identification information from the storage unit based on a specification made by a user, and displaying the image on the display unit.

16 Claims, 6 Drawing Sheets

(56) References Cited

U.S. PATENT DOCUMENTS

| | | |
|---|---|---|
| 2002/0142845 A1 | 10/2002 | Whitten |
| 2004/0087363 A1* | 5/2004 | Bogenn ............ 463/29 |
| 2005/0091597 A1* | 4/2005 | Ackley ............ 715/716 |
| 2007/0294089 A1* | 12/2007 | Garbow et al. ............ 705/1 |

FOREIGN PATENT DOCUMENTS

| | | |
|---|---|---|
| JP | 2000293413 A | 10/2000 |
| JP | 200285825 A | 3/2002 |
| JP | 2002078956 A | 3/2002 |
| JP | 2002358221 A | 12/2002 |
| JP | 2003109025 A | 4/2003 |
| JP | 2003117239 A | 4/2003 |

OTHER PUBLICATIONS

Fighting Studio, "Doubutsu no Mori e+, Nonbiri Seikatsu Book (Animal Crossing e+, Leisurely Life Book)," fifth edition, Futabasha Publishers Ltd., p. 108, 5 pages May 5, 2004,(English translation not available. For relevancy see Office Action for corresponding JP Application No. 2007-289378, dated Feb. 4, 2014).

Office Action for corresponding Japanese Patent Application No. 2007-289378, dated May 7, 2013.

Office Action for corresponding Japanese Patent Application No. 2007-289378, dated Sep. 11, 2012.

* cited by examiner (a)

(b)

(c)

GAME DEVICE, IMAGE PROCESSING METHOD, AND INFORMATION RECORDING MEDIUM

BACKGROUND OF THE INVENTION

1. Field of the Invention

The present invention relates to a game device, an image processing method, and an information recording medium, and more particularly, to a save of an image of a game screen generated by a computer game program.

2. Description of the Related Art

There is known a so-called screenshot function that allows an image of a screen being generated by a computer program during execution of the program to be stored in storage means such as a hard disk drive or a memory device according to a user's instruction. With this function, the user performs a predetermined operation while viewing the displayed screen to thereby store the image of the screen in the memory device temporarily. After that, the user sets a file name, and specifies an arbitrary saving location on the hard disk drive to cause a file of the image stored in the memory device to be stored onto the hard disk drive. According to this function, the user can later view the image of the screen displayed during execution of the program (see EP 983,782 A).

With the above-mentioned related art, in a case where various game programs are executed by a computer and images of screens generated by the respective game programs are stored in shared storage means, there occurs an inconvenience in viewing the images in a later time unless files of the images each have a file name set appropriately and a saving location specified appropriately. However, such tasks are generally cumbersome.

SUMMARY OF THE INVENTION

The present invention has been made in view of the above-mentioned problem, and an object thereof is to provide a game device, an image processing method, and an information recording medium, which allow images of game screens concerning a plurality of game programs to be systematically stored in storage means and a desired image to be swiftly displayed on display means in a later time.

In order to solve the above-mentioned problem, a game device according to the present invention includes: program executing means for executing each of a plurality of game programs; identification information acquiring means for acquiring identification information on one of the plurality of game programs during execution of the one of the plurality of game programs; image acquiring means for acquiring at least one image of a game screen generated during the execution of the one of the plurality of game programs; image storing means for storing the at least one image into storage means in association with the identification information; and display control means for reading one or more images stored in association with any one of the identification information from the storage means based on a specification made by a user, and displaying the images on display means.

An image processing method according to the present invention includes: a program executing step of executing a game program; an identification information acquiring step of acquiring identification information on the game program during execution of the game program; an image acquiring step of acquiring at least one image of a game screen generated during the execution of the game program; an image storing step of storing the at least one image into storage means in association with the identification information; and a display control step of reading one or more images stored in association with any one of the identification information from the storage means based on a specification made by a user, and displaying the images on display means.

A program according to the present invention causes a computer to function as: program executing means for executing a game program; identification information acquiring means for acquiring identification information on the game program during execution of the game program; image acquiring means for acquiring at least one image of a game screen generated during the execution of the game program; image storing means for storing the at least one image into storage means in association with the identification information; and display control means for reading one or more images stored in association with any one of the identification information from the storage means based on a specification made by a user, and displaying the images on display means. This program may be stored on a computer-readable information recording medium such as a CD-ROM or a DVD-ROM.

DETAILED DESCRIPTION OF THE PREFERRED EMBODIMENTS

Hereinafter, preferred embodiments of the present invention are described in detail with reference to the accompanying drawings.

Figure 1:
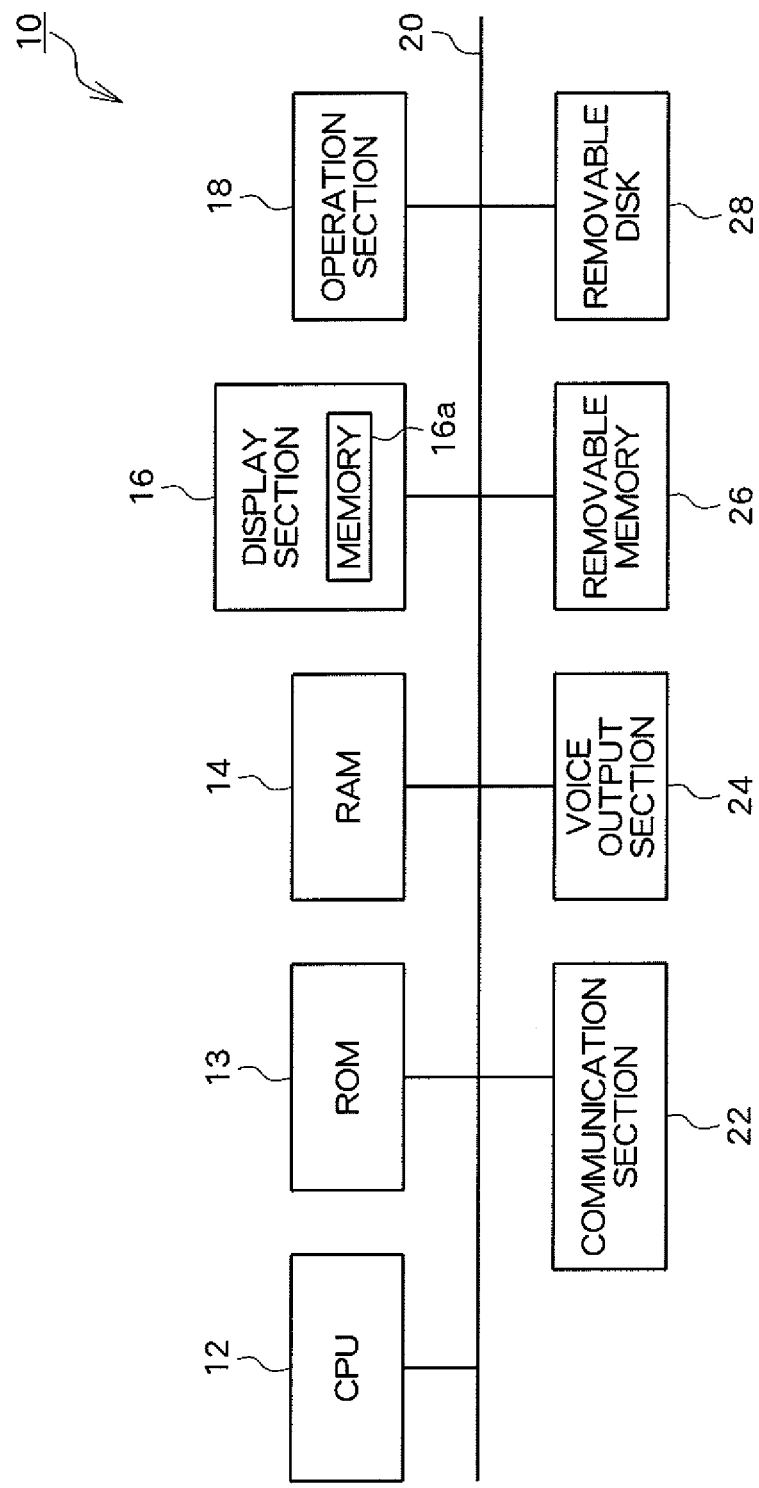
FIG. 1 is a diagram showing a hardware configuration of a game device according to an embodiment of the present invention.

FIG. 1 is a diagram showing a hardware configuration of a game device according to an embodiment of the present invention. As shown in FIG. 1, a game device 10 includes a CPU 12, a ROM 13, a RAM 14, a display section 16, an operation section 18, a communication section 22, a voice output section 24, a removable memory 26, and a removable disk 28, constituting a computer game system with those components being connected to a bus 20 so as to exchange data with one another. The computer game system may be configured as, for example, a portable game device that is driven by a battery.

Here, the ROM 13 (information recording medium) stores a program such as an operating system. The program of the operating system may be installed into the ROM 13 from another information recording medium such as the removable disk 28. The RAM 14 is used as a work memory. The display section 16 is configured by including a display device such as a liquid crystal display (LCD) and a memory 16a for display, and displays a screen on the display device based on drawn image data within the memory (video RAM (VRAM)) 16a for display. The operation section 18 includes a button and an arrow key, and is used by the user to perform various instructions with respect to the game device 10. The communication section 22 is used by the game device 10 to perform data communication with another computer in a wired or wireless communication. The voice output section 24 is configured by including a speaker and a voice synthesis IC, and outputs a voice from the speaker in response to an instruction from the CPU 12. The removable memory 26 represents a portable storage medium which is constituted of a semiconductor memory or the like and to/from which data is written/read. In this case, the removable memory 26 is used to store a so-called save data, which is data for indicating a situation of the game being played, or store a so-called screenshot image, which is an image of the game screen generated by the game program. The removable disk 28 represents a portable storage medium having a relatively large capacity, which is constituted of a semiconductor memory, a magneto-optical disk, or the like, and from which data is read. In this case, the game program is previously stored on the above-mentioned storage medium. By replacing the removable disk 28, the user can cause the game device 10 to load and execute various game programs. The CPU 12 executes the operating system stored in the ROM 13 and the game program stored on the removable disk 28 to thereby control each section of the game device 10. In particular, the CPU 12 executes the game program and the operating system to generate the image of the display screen and store the image in the memory 16a of the display section 16.

Figure 2:
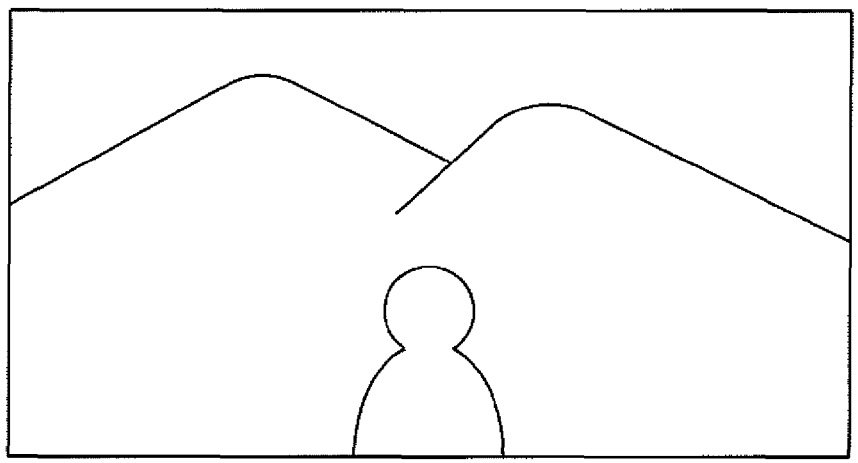
FIGS. 2A to 2C are diagrams showing examples of a screen of a display section.
Figure 2:
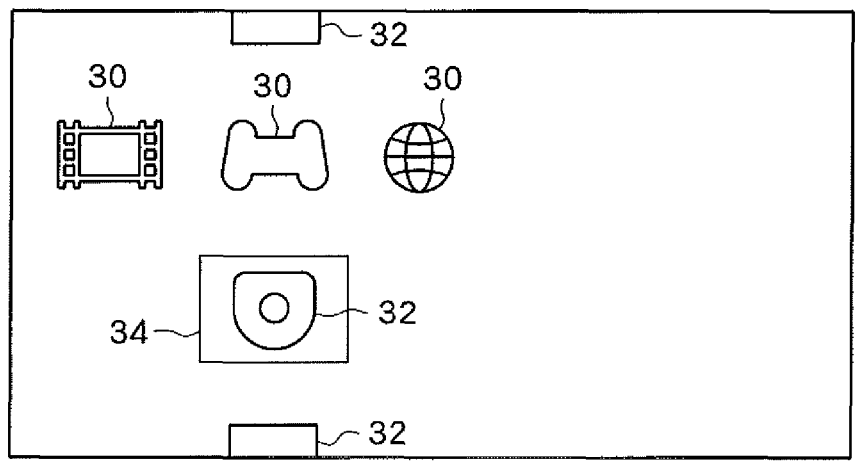
Figure 2:
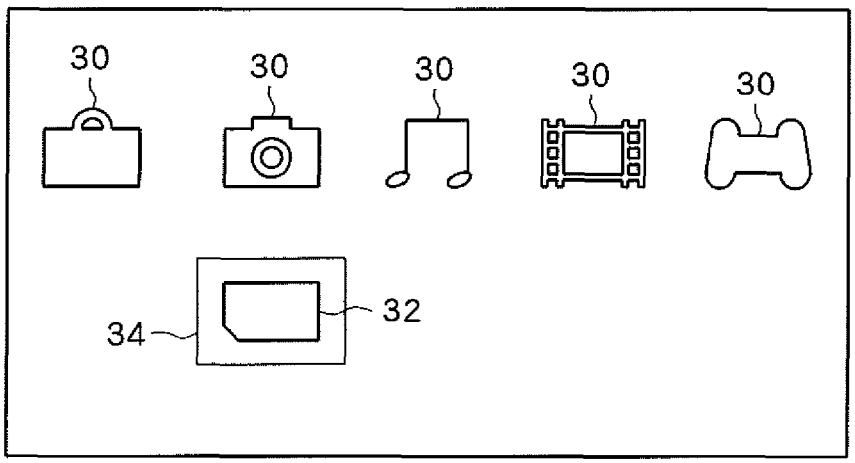

The operating system according to this embodiment is provided with a so-called screenshot program module which saves the image of the game screen being generated by the game program into the removable memory 26 in response to an instruction from the game program being executed. That is, FIG. 2A shows an example of the game screen displayed in the display section 16 during execution of the game program, and when a predetermined screenshot operation is performed during execution of the game program by the operation section 18, the game program instructs the operating system to execute the screenshot operation. The screenshot program module included in the operating system copies an image that is stored in the memory 16a at the time instant to the removable memory 26. At this time, a directory corresponding to the game program being currently executed has been created in the removable memory 26, and the image (screenshot image) of the game screen is stored into the directory.

After that, when the user uses the operation section 18 to perform an operation for terminating the game program, a menu screen by the operating system is displayed in the display section 16. FIGS. 2B, 2C, and 3A to 3C each show an example of the menu screen. On the menu screen, a plurality of category icons 30 indicating categories of functions provided to the game device 10 are displayed, and a horizontal-direction operation of the arrow key of the operation section 18 can move an arbitrary one of the category icons 30 to a predetermined position within the screen, while a vertical-direction operation of the arrow key allows a cursor 34 to specify an arbitrary one of icons 32 belonging to a category indicated by the category icon 30.

On the screen shown in FIG. 2B, the category icon 30 indicating the execution of the game program (an image indicating an operation device for the game) is located in the predetermined position of the screen, and the cursor 34 specifies an arbitrary one of icons 32 belonging to the same category indicated by the category icon 30. On the other hand, on the screen shown in FIG. 2C, the category icon 30 indicating displaying of a photograph (an image indicating a camera) is located in the predetermined position of the screen, and the cursor 34 specifies the icon 32 (an image indicating a storage medium) that belongs to the same category and indicates the removable memory 26.

Figure 3:
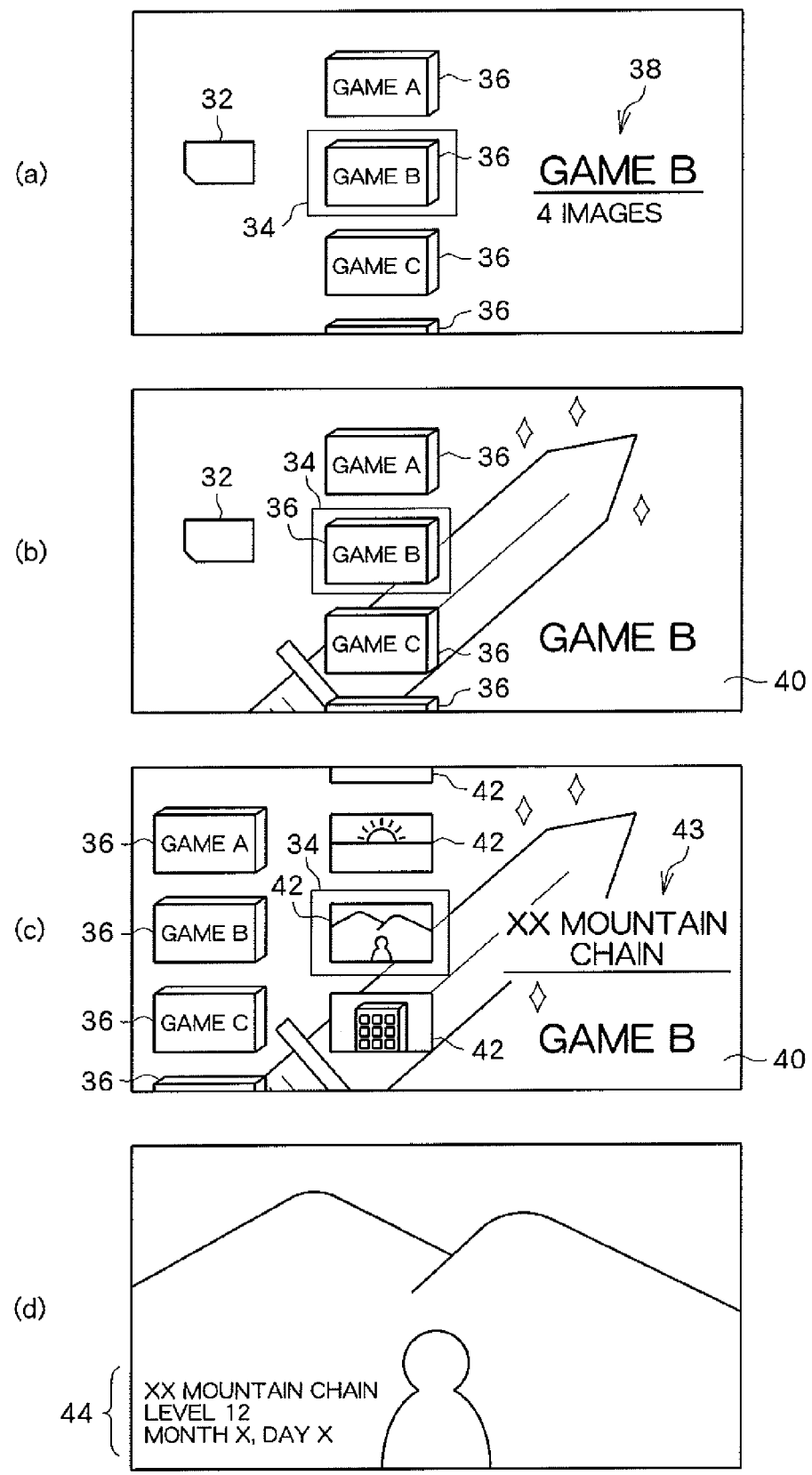
FIGS. 3A to 3D are diagrams showing examples of the screen of the display section.

When the user operates the arrow key of the operation section 18 to cause transition from the screen of FIG. 2B to the screen of FIG. 2C and depresses a determination button of the operation section 18, a screen of FIG. 3A is displayed. On this screen, folder icons 36 are displayed in a vertical direction for each game program whose screenshot image is saved. On each of the folder icons 36, a title character string 38 of the game program corresponding to the folder icon 36 is displayed. One of the folder icons 36 is specified by the cursor 34, and on its right side, the title character string 38 (here, "GAME B") of the game program is displayed in a larger font size, under which the number of screenshot images saved from the game program (here, "4 images") is displayed. If the operation section 18 is kept in this state without any operation for a predetermined period of time (for example, 2 to 3 seconds), a background image 40 is displayed. The background image 40 represents a picture that symbolizes the game program whose folder icon 36 is being currently specified by the cursor 34 and its title character string 38.

After an arbitrary one of the folder icons 36 is specified by the cursor 34 on a screen of FIG. 3B, when the determination button of the operation section 18 is depressed, a screen of FIG. 3C is displayed. Displayed on the screen are thumbnails (reduced images) 42 of screenshot images stored in a folder corresponding to the specified folder icon 36. One of the thumbnails 42 is specified by the cursor 34, and on its right side an image name 43 (character string) is displayed. The image name 43 represents a part of a file name (i.e., the file name excluding an extension) of the screenshot image. When the user uses the cursor 34 to specify an arbitrary thumbnail 42 and depresses the determination button of the operation section 18, the screenshot image is displayed in the display section 16 to fill the entire screen of the display section 16 as shown in FIG. 3D. At this time, a comment character string 44 related to the screenshot image is superimposed at the lower left corner of the screenshot image. The comment character string 44 may be hidden by performing a predetermined operation on the operation section 18.

Figure 4:
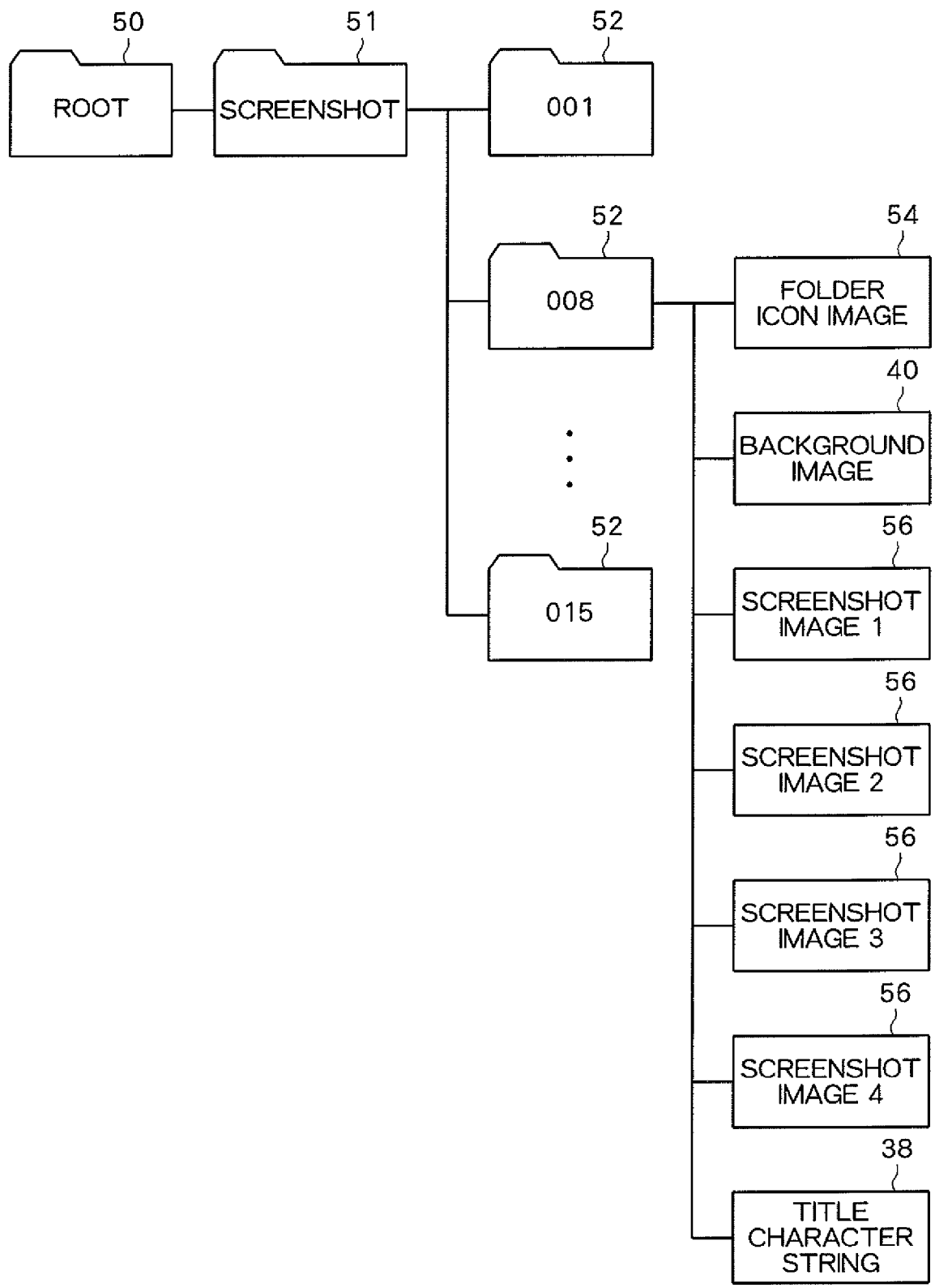
FIG. 4 is a diagram showing a directory structure of a removable memory.

FIG. 4 shows a directory structure of the removable memory 26. Under a root directory 50 of the removable memory 26, a screenshot directory 51 is created, under which subdirectories 52 corresponding to the respective game programs are created. A name of each of the subdirectories 52 is set as an ID (identification information) of the game program. The operating system receives a notification of the ID in a case of receiving an instruction for the screenshot from a given game program. The operating system checks whether or not the subdirectory 52 of the notified ID has already been created under the screenshot directory 51, and if the subdirectory 52 has been created, a newly acquired screenshot image is stored into the subdirectory 52. If the subdirectory 52 has not been created yet, such a new subdirectory 52 as to have the ID as its directory name is created under the screenshot directory 51. Then, the newly acquired screenshot image is stored into the newly created subdirectory 52.

Stored in each of the subdirectories 52 are files including a folder icon image 54, the background image 40, one or more screenshot images 56, and the title character string 38. The folder icon image 54 represents an icon image for displaying the folder icon 36, and is copied from the removable disk 28. The background image 40 represents an image displayed in the display section 16 in a case where the folder icon 36 whose folder icon image 54 is displayed is specified by the cursor 34 (see FIGS. 3B and 3C). The background image 40 is also copied from the removable disk 28. The screenshot images 56 are copied by the operating system from the memory 16a of the display section 16. The file name of each of the screenshot images 56 is specified by the game program, and has its part displayed as the image name 43 on the menu screen shown in FIG. 3C. The title character string 38 represents a character string indicating a title of the game program, and is also specified by the game program. The title character string 38 is displayed on the menu screen shown in FIG. 3A.

Figure 5:
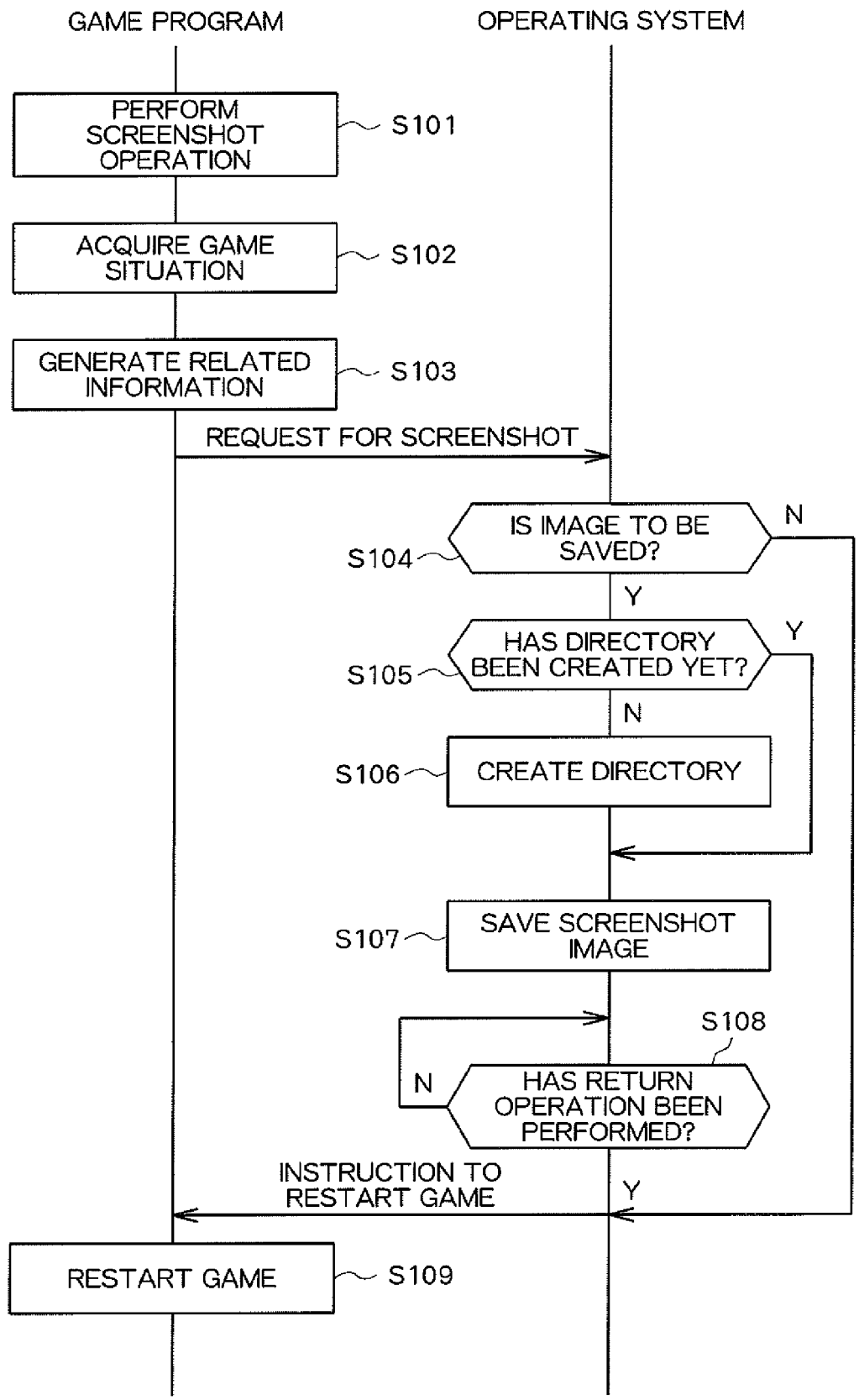
FIG. 5 is a sequence diagram showing a processing of saving a screenshot image on the game device.

Hereinafter, a description is made of an operation sequence of the game device 10 executing the screenshot operation. As shown in FIG. 5, during the execution of the game program, when the user uses the operation section 18 to perform a predetermined screenshot operation (S101), the game program pauses the execution of the game program, and acquires data indicating a situation of the game being played at the timing (S102). Examples of the data include a growth level of a game character, a position of the game character within a game space, and a current time of the game space. Then, the game program generates related information on the screenshot image (S103). The related information contains (1) a specified image format (for example, JPEG or PNG) of the screenshot image, (2) the ID of the game program, (3) the title character string 38, (4) a location where the folder icon image 54 is saved, (5) a location where the background image 40 is saved, (6) the file name of the screenshot image, and (7) the comment character string 44 with its display format. The display format includes information required when the comment character string 44 is superimposed on the screenshot image, which contains a font size, a font color, a background color, and a position of the superimposition within the screenshot image. The game program determines the font color, the background color, and the display position of the comment character string 44 based on the currently displayed contents of the screenshot image in order to prevent the screenshot image from becoming hard to recognize even if the comment character string 44 is superimposed thereon. Based on the information on the display format, the operating system then displays the screen of FIG. 3D.

Further, based on the data acquired in Step S102, the game program determines the comment character string 44 and the file name of the screenshot image. For example, if the data indicating the situation of the game is the data indicating the position of the game character operated by the user within the game space, a name of the spatial position is set as the file name of the screenshot image or as the comment character string 44. If the data indicating the situation of the game is the data indicating an event that is currently being executed by the game program, a name of the event is set as the file name of the screenshot image or as the comment character string 44. The game program passes the related information generated as described above to the operating system to issue a request that the screenshot image be saved.

The operating system, which has received the request, displays in the display section 16 a screen for inquiring the user whether or not the screenshot image be really saved, and if the user uses the operation section 18 to issue such an instruction as not to save the image in response to the inquiry, the operating system instructs the game program to restart the game (S104). Upon reception of the instruction, the game program restarts the execution of the game program (S109).

On the other hand, if the user issue such an instruction as to save the image, the operating system then checks whether or not the subdirectory 52 corresponding to the game program has already been created under the screenshot directory 51 within the removable memory 26 (S105). To be specific, the operating system reads the ID of the game program from the related information passed by the game program, and checks whether or not the subdirectory 52 having the ID as its directory name exists under the screenshot directory 51. If the subdirectory 52 as described above does not exist, the subdirectory 52 is created (S106). At this time, based on the related information passed by the game program, the operating system reads the folder icon image 54 and the background image 40 from the removable disk 28, and stores the folder icon image 54 and the background image 40 into the created subdirectory 52. In addition, based on the related information, the file of the title character string 38 is also stored.

Subsequently, the operating system copies an image (image of the game screen generated by the game program) stored in the memory 16a of the display section 16, as the screenshot image 56, to the subdirectory 52 whose directory name is set to the ID of the game program contained in the related information (S107). Used at this time as the file name of the screenshot image 56 is the one contained in the related information passed by the game program. In addition, the image format is the one specified in the related information. Further, the comment character string 44 and its display format are saved as a part (meta information) of the image file of the screenshot image 56. After that, the operating system monitors whether or not a predetermined return operation is performed through the operation section 18, and if the operation is performed, the operating system instructs the game program to restart the game. Upon reception of the instruction, the game program restarts the execution of the game program (S109).

With this embodiment, on the operating system, in an environment that allows execution of the plurality of game programs supplied from the removable disk 28, if the operating system is instructed to save the screenshot image during the execution of any one of the game programs, the screenshot image is saved in association with the identification information of the game program. Then, when the cursor 34 is used to specify an arbitrary folder icon 36, thereby specifying the identification information of any one of the game programs, the screenshot image 56 stored in the subdirectory 52 associated with the identification information is read and displayed in the display section 16. Accordingly, the user does not need to specify the location where the screenshot image is saved through input means such as a keyboard, which can improve convenience. Further, in this embodiment, the game program acquires a game situation of the game program being executed, and generates the related information on the screenshot image based on the game situation. Since a part of the related information is made to be displayed (FIGS. 3C and 3D), the user can immediately learn what kind of game situation the screenshot image has been acquired in.

Note that the present invention is not limited to the above-mentioned embodiment, and various modifications can be made. For example, the screenshot image does not need to be a static image but may be a moving image.

Further, as a part of the related information, the game program may include numerical value information indicating a position of a current game scene in a sequence. That is, the sequence in which the respective game screens are generated may be managed by the game program, and the numerical value information indicating positions in the sequence may be stored in the subdirectory 52 along with the screenshot image 56. In this case, if the operating system sequentially displays the screenshot images in an order based on the numerical value information, it becomes easy for the user to recall the situation of the game played by the user himself/herself.

Further, in a case where a new screenshot image for a given game program is saved into the removable memory 26, the screenshot image 56 that is associated with the ID of the game program and further associated with the numerical value information indicating the position of the same game scene in the sequence may be deleted, if existing. This can prevent a large number of similar images from being stored in the removable memory 26 with overlaps. In a similar manner, the screenshot image 56 having the same file name as the one that has already been stored may be deleted.

Figure 6:
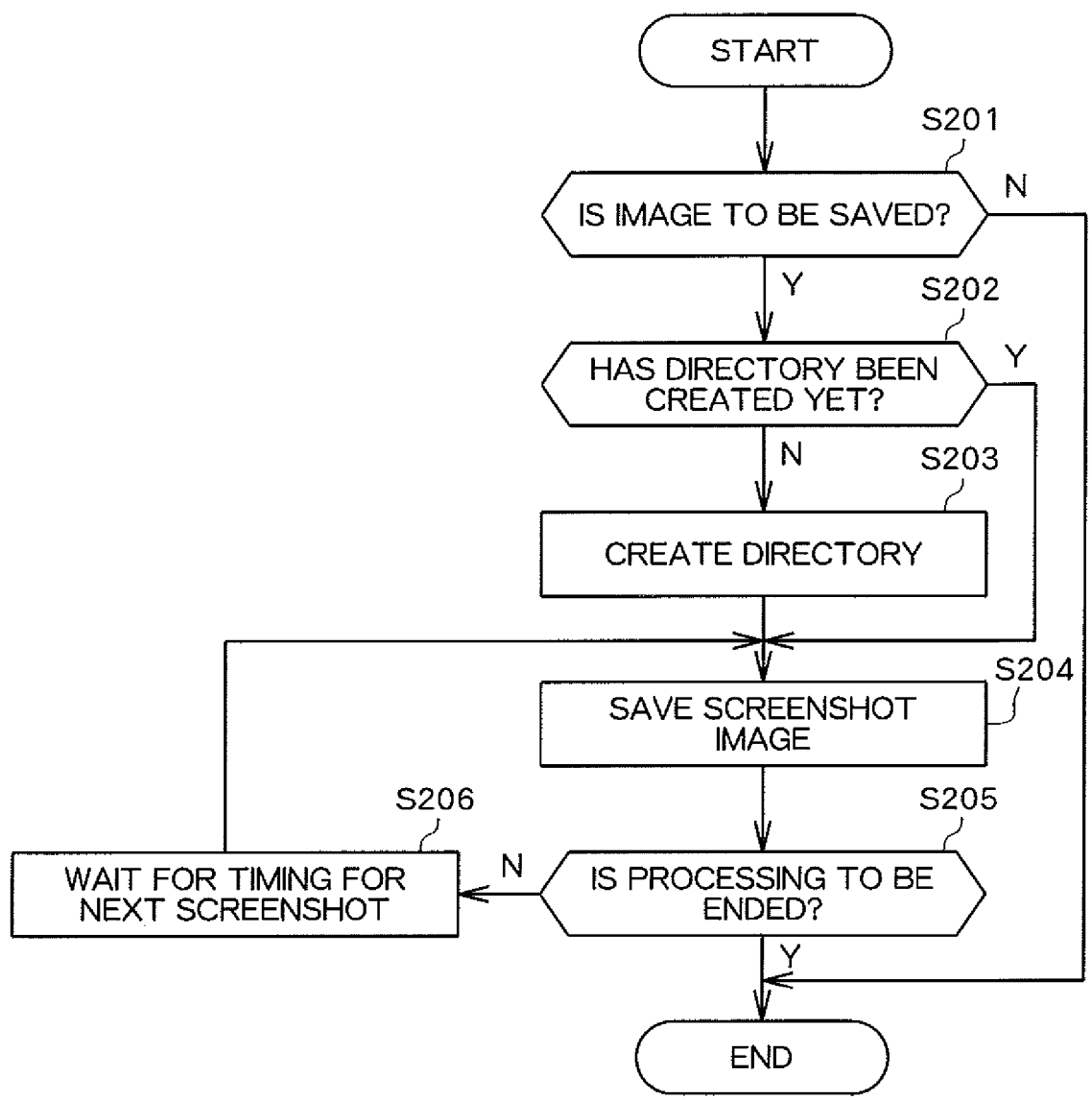
FIG. 6 is a flowchart showing a continuous acquisition processing for the screenshot image on the game device.

Further, the operating system may sequentially acquire the screenshot images at timings based on an execution situation of the game program and save the screenshot images in the removable memory 26. FIG. 6 shows a processing according to such a modified example as described above. If instructed for such continuous acquisition of the screenshot images, the operating system first displays in the display section 16 a screen for inquiring the user whether or not the screenshot image be really saved (S201). If the user issues such an instruction as not to save the image in response to the inquiry, the operating system ends the processing related to the screenshot operation. On the other hand, if the user issues such an instruction as to save the screenshot image, the operating system then checks whether or not the subdirectory 52 corresponding to the game program has already been created under the screenshot directory 51 within the removable memory 26 (S202), and if the subdirectory 52 as described above does not exist, the subdirectory 52 is created (S203). The processings so far are the same as the processings of Steps S104 to S106 of FIG. 5.

Subsequently, the operating system copies the image stored in the memory 16a of the display section 16, as the screenshot image 56, to the subdirectory 52 whose directory name is set to the ID of the game program contained in the related information (S204). Then, until an instruction to end the continuous acquisition processing is received from the game program (S205), the operating system waits for a timing of acquiring the next screenshot image, and if the timing is reached, the operating system repeats Step S204 to newly acquire the screenshot image and save the screenshot image in the removable memory 26. The timing is determined based on the execution situation of the game program. For example, by generating a motion difference between the images of the game screens stored in the memory 16a of the display section 16, the timing at which the motion difference becomes large may be set as the timing of acquiring the next screenshot image. Alternatively, based on color information on the images of the game screens, the timing at which a color tone changes to a large extent may be set as the timing of acquiring the next screenshot image. This can prevent a large number of similar screenshot images from being saved with overlaps, thereby solving a conventional problem.

What is claimed is:

1. A game device, comprising:
   program executing means for executing each of a plurality of game programs;
   identification information acquiring means for acquiring identification information on one of the plurality of game programs during execution of the one of the plurality of game programs;
   image acquiring means for acquiring at least one image of a game screen generated during the execution of the one of the plurality of game programs;
   storage means for storing images obtained by the image acquiring means;
   image storing means for: (i) storing the at least one image into the storage means in association with the identification information, and (ii) judging whether or not there already exists at least one previously stored image in the storage means in association with the identification information, and if there already exists at least one previously stored image, the image storing means stores the at least one image in association with the same identification information as the at least one previously stored image into the storage means; and
   display control means for: (i) displaying an icon on a display means, the icon being associated with the one of the game programs, (ii) displaying related information concerning the one of the game programs and a total number of the previously stored images associated with the identification information, such displaying being on the display means adjacent to the icon and in response to a user specifying the icon on the display means, (iii) reading one or more images stored in association with any one of the identification information from the storage means based on a specification made by the user, and (iv) displaying the images on the display means,
   wherein the display control means displays a background image that is associated with the icon and symbolizes the one of the game programs, such displaying being in a background of the display means and in response to the user maintaining the specifying of the icon on the display means for at least a predetermined time.

2. A game device according to claim 1, wherein if the image storing means judges that there does not already exist at least one previously stored image in association with the identification information, the image storing means creates a folder for the storage means, the folder having a name that is based on the identification information, and stores the at least one image within the folder, thereby being stored in association with the identification information of the one of the plurality of game programs.

3. A game device according to claim 1, wherein:
   the image acquiring means further acquires the related information on the image of the game screen along with the image; and
   the image storing means further stores the related information on the image into the storage means along with the image.

4. A game device according to claim 3, wherein:
   the related information includes a title image indicating a title of the one of the plurality of game programs; and
   the display control means further displays one or a plurality of the title images on the display means, while receiving a specification of one of the title images from the user.

5. A game device according to claim 3, wherein the related information includes character string information indicating a game scene displayed in the image.

6. A game device according to claim 5, wherein the related information includes numerical value information indicating a sequential position of a game scene displayed in the image.

7. A game device according to claim 6, wherein the display control means displays the images stored in the storage means on the display means in an order based on the numerical value information.

8. A game device according to claim 5, wherein the image storing means includes image deleting means for deleting the image that has already been stored in the storage means based on the related information on the image in a case where the image is newly stored into the storage means in association with the identification information.

9. A game device according to claim 3, wherein:
   the related information includes position information indicating a position within the image; and the display control means includes means for superimposing at least a part of the related information on the image in the position indicated by the position information.

10. A game device according to claim 3, wherein the related information is generated by the one of the plurality of game programs.

11. A game device according to claim 1, wherein the image acquiring means further acquires the images of the game screen generated during the execution of the one of the plurality of game programs sequentially based on a situation in which the one of the plurality of game programs is being executed by the program executing means.

12. The game device of claim 1, wherein the display control means is further for displaying a thumbnail image for the previously stored images associated with the identification information on the display means and in response to the user selecting the icon on the display means.

13. The game device of claim 12, wherein the display control means is further for displaying a name of one of the previously stored images on the display means adjacent to the associated thumbnail image in response to the user specifying the thumbnail image on the display means.

14. An image processing method, comprising:
executing a game program on a computer processor;
acquiring identification information on the game program during execution of the game program on the computer processor;
acquiring at least one image of a game screen generated during the execution of the game program;
storing the at least one image into a storage means, where the at least one image is stored by the computer processor in association with the identification information, and the computer processor judges whether or not there already exists at least one previously stored image in the storage means in association with the identification information, and if there already exists at least one previously stored image in association with the identification information, the computer processor stores the at least one image in association with the same identification information as the at least one previously stored image into the storage means;
displaying an icon on a display means, the icon being associated with the one of the game programs;
displaying related information concerning the one of the game programs and a total number of the previously stored images associated with the identification information, such displaying being on the display means adjacent to the icon and in response to a user specifying the icon on the display means;
reading one or more images stored in association with any one of the identification information from the storage means based on a specification made by the user, and displaying the images on the display means; and
displaying a background image that is associated with the icon and symbolizes the one of the game programs, such displaying being in a background of the displaying steps and in response to the user maintaining the specifying of the icon on the display means for at least a predetermined time.

15. A non-transitory, computer readable recording medium, which stores a program for causing a computer to function as:
program executing means for executing a game program;
identification information acquiring means for acquiring identification information on the game program during execution of the game program;
image acquiring means for acquiring at least one image of a game screen generated during the execution of the game program;
image storing means for: (i) storing the at least one image into a storage means in association with the identification information, and (ii) judging whether or not there already exists at least one previously stored image in the storage means in association with the identification information, and if there already exists at least one previously stored image, the image storing means stores the at least one image in association with the same identification information as the at least one previously stored image into the storage means; and
display control means for: (i) displaying an icon on a display means, the icon being associated with the one of the game programs, (ii) displaying related information concerning the one of the game programs and a total number of the previously stored images associated with the identification information, such displaying being on the display means adjacent to the icon and in response to a user specifying the icon on the display means, (iii) reading one or more images stored in association with any one of the identification information from the storage means based on a specification made by the user, and (iv) displaying the images on the display means,
wherein the display control means displays a background image that is associated with the icon and symbolizes the one of the game programs, such displaying being in a background of the display means and in response to the user maintaining the specifying of the icon on the display means for at least a predetermined time.

16. A game device, comprising:
program executing means for executing each of a plurality of game programs;
identification information acquiring means for acquiring a game title as identification information on one of the plurality of game programs during execution of the one of the plurality of game programs;
image acquiring means for acquiring at least one image of a game screen generated during the execution of the one of the plurality of game programs;
storage means for storing images obtained by the image acquiring means;
image storing means for: (i) storing the at least one image into the storage means in association with the identification information by storing the at least one image in a folder of the storage means, the folder having a name that is based on the identification information, and (ii) judging whether or not there already exists at least one previously stored image in the storage means in association with the identification information, and if: (a) there already exists at least one previously stored image in the folder, the image storing means stores the at least one image in association with the same identification information as the at least one previously stored image into the folder of the storage means, and (b) if there does not already exist at least one previously stored image in the folder in association with the identification information, the image storing means creates the folder for the storage means, the folder having a name that is based on the identification information, and stores the at least one image within the folder, thereby being stored in association with the identification information of the one of the plurality of game programs; and
display control means for: (i) displaying an icon on a display means, the icon being associated with the one of the game programs, (ii) displaying related information concerning the one of the game programs and a total number of the previously stored images associated with the identification information, such displaying being on the display means adjacent to the icon and in response to a user specifying the icon on the display means, (iii) reading one or more images stored in association with any one of the identification information from the storage means based on a specification made by a user, and displaying the images on display means, wherein the display control means displays a background image that is associated with the icon and symbolizes the one of the game programs, such displaying being in a background of the display means and in response to the user maintaining the specifying of the icon on the display means for at least a predetermined time.

* * * * *